United States Patent [19]

Otani et al.

[11] Patent Number: 4,850,556
[45] Date of Patent: Jul. 25, 1989

[54] POT COVER HOLDER

[76] Inventors: Neal M. Otani; Janis M. J. Fong-Otani, both of 99-433 Kekoa Pl., Aiea, Hi. 96701

[21] Appl. No.: 152,300
[22] Filed: Feb. 4, 1988
[51] Int. Cl.⁴ .......................................... F16B 47/00
[52] U.S. Cl. ................................ 248/206.2; 248/302; 248/309.1
[58] Field of Search .............. 248/206.2, 206.3, 205.3, 248/206.4, 309.1, 309.3, DIG. 2, 311.2, 302, 175, 213.2, 107; 211/70.7, 181

[56] References Cited

U.S. PATENT DOCUMENTS

| Re. 21,391 | 3/1940 | Holden | 248/206.3 X |
|---|---|---|---|
| 735,088 | 8/1903 | Gold | 248/37.6 |
| 746,878 | 12/1903 | Reichelt | 248/175 |
| 807,840 | 12/1905 | Martin et al. | 248/37.6 |
| 927,088 | 7/1909 | Wallace | 248/37.6 |
| 1,298,212 | 3/1919 | Holdsworth | 248/213.2 X |
| 1,327,437 | 1/1920 | Lewis | 248/37.6 |
| 1,928,995 | 10/1933 | De Biasi | 248/37.6 X |
| 2,286,012 | 6/1942 | Rochow | 248/311.2 X |
| 2,594,473 | 4/1952 | McCoy | 248/37.3 |
| 3,163,385 | 12/1964 | Lazan, Jr. | 248/37.6 |

FOREIGN PATENT DOCUMENTS

| 271771 | 6/1927 | United Kingdom | 248/37.6 |
|---|---|---|---|
| 446062 | 4/1936 | United Kingdom | 248/37.6 |

*Primary Examiner*—Ramon S. Britts
*Assistant Examiner*—Karen J. Chotkowski
*Attorney, Agent, or Firm*—James C. Wray

[57] ABSTRACT

A pot cover holder is made of preformed wire with two sides. An inner side has two suction cups attached to the top. The pot cover slips between the two sides with the handle of the pot cover resting on the indented middle of the outer side. The suction cups are used to attach the invention to kitchen walls or sides of kitchen utilities such as a stove or refrigerator. The bottom incorporates a catch function to trap moisture or food run-off. The holder eliminates the need of placing a pot cover onto a countertop where burns, water stains, water or food run-off and limited space are problems. The invention allows the user to place the pot cover in an out-of-the-way area where the above problems will not exist.

4 Claims, 1 Drawing Sheet

POT COVER HOLDER

BACKGROUND OF THE INVENTION

Pot covers are often removed from hot cooking pots or frying pans and placed on a countertop. Material inside the cover or along the edges of the cover may dirty the countertop. A cover which is exceptionally hot may scorch or burn a countertop. The pot cover must be kept clean when it is placed on the countertop. Therefore, it cannot be placed in a sink which may be partially filled with soapy water, for example. Since the countertop often carries moisture or moist products it is liable to pick up dust or unwanted particulate matter with which it comes in contact. Often there is little room to place a pot cover aside when preparing complex meals. The problems exist in private and commercial kitchens and anywhere food is prepared.

The present invention overcomes known problems of the prior art.

A preferred embodiment of pot cover holder of the present invention is formed from a unitary wire frame having a first mounting portion, a second pot cover holding portion and third intermediate portions joining the first and second portions. The first portion has parallel vertically oriented lengths of wire having upper ends configured for joining to attachment means for mounting the holder on a vertical surface and having lower ends joined to the third intermediate portions. The second pot cover holding portion is a wire loop having first and second legs extending generally upward from the third intermediate portions and having upper ends spaced outward from the vertical wires of the first portion. A middle pot cover knob-receiving section of the second portion has upper extremities connected to upper ends of the legs. The middle section extends downward and inward to a middle point which is spaced downward and inward from the upper ends of the legs. The middle section thereby forms a V section. The second cover holding portion thereby forms an M-shaped portion. A pot cover knob is received within the V-shaped section and the pot cover rests against the legs of the M-shaped holder portion when a pot cover is held in the holder.

The preferred intermediate portions are two bent generally V-shaped connecting sections of the unitary wire between the first vertical sections of the attachmnt portion and lower ends of the legs of the second holder portion.

In one preferred embodiment, a drip catcher is connected to the intermediate portion.

A preferred drip catcher has a V-shaped trough having a first wall overlying the attachment portion vertical wires. A second wall overlies the legs of the holder portion. Side walls interconnect the first and second walls.

Preferably, an attachment attaches the drip catcher to at least one of the first and second portions.

A preferred attachment uses side wall extensions wrapped around the wire of the first and second portions and fastened to the first and second walls of the drip catcher.

In one preferred holder embodiment, the V-shaped middle section of the second holder portion and the legs of the second holder portion are formed in a single plane.

A preferred attachment fixed to upper ends of the vertical wires comprises suction cups having outward extending knobs. Ends of the wires are formed in circles for attachment to the knobs.

One preferred pot cover holder has first and second generally V-shaped sides having proximal and distal ends. The proximal ends are configured for attaching to wall attachments. A generally V-shaped pot cover knob-receiver is connected to distal ends of the V-shaped sides. A drip-catcher pan is mounted between the V-shaped sides at lower convergent portions thereof for receiving drips from a pot cover held within the V-shaped knob-receiver.

In one preferred embodiment the proximal ends are configured as loops, and suction cups are connected to the loops for attaching the pot cover holder to a vertical surface.

A preferred pot cover holder has a single continuous wire having a loop in a first end and having a first suction cup attached to the first loop. The wire extends downward in a first vertical part, is bent upward and outward in a first outward leg and then is bent downward and transversely to a medial point. The wire is then bent upward and transversely and then downward to form a second leg, and then is bent upward to form a second vertical part, terminating upwardly in a second loop which is attached to a second suction cup. The suction cups attach the pot cover holder to a vertical surface.

In that embodiment, sides of the pot cover holder are formed in general V shapes, and a medial portion of the pot cover holder is formed in a general V shape in a plane substantially transverse to the first V shapes of the sides. The medial portion receives a knob of a pot cover and holds the knob with the pot cover resting against the legs.

These and further and other objects and features of the invention are apparent in the disclosure which includes the above and ongoing written description, including the claims and the drawings.

DETAILED DESCRIPTION OF THE DRAWINGS

Figure 1:
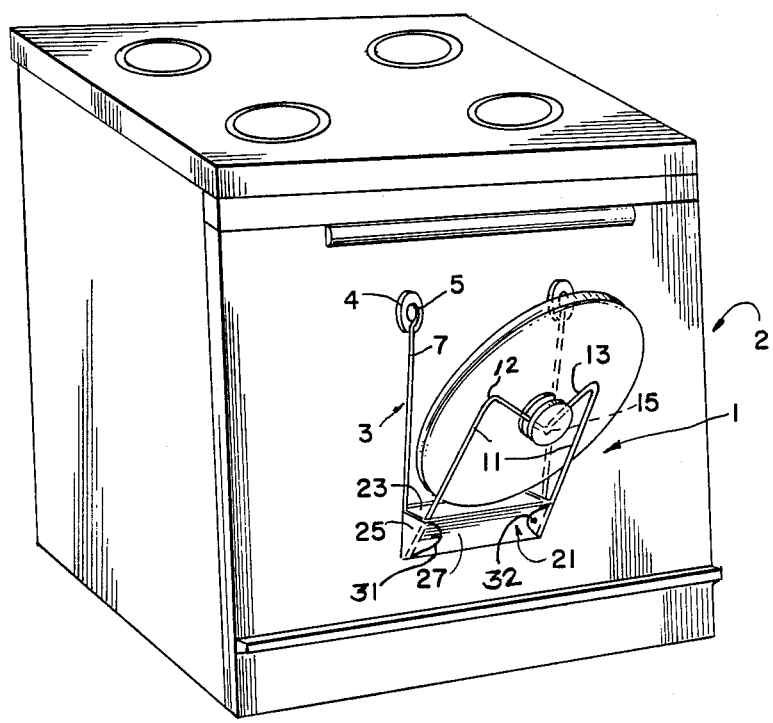
FIG. 1 is a detail of a pot cover holder positioned on a door of an oven beneath a range.
Figure 2:
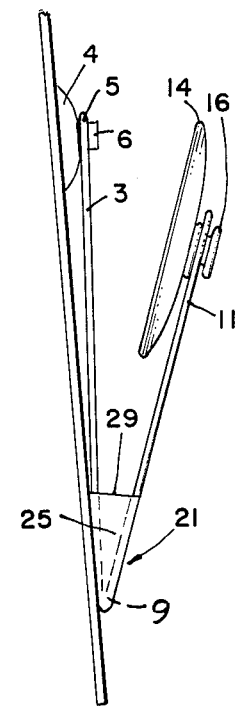
FIG. 2 is a side view of the pot cover holder shown in FIG. 1, showing its use with a smaller cover.

Referring to FIG. 1, a pot cover holder, generally indicated by the number 1, is attached to the door of an oven 2. The pot cover holder 1 is formed of one continuous wire 3 which is attached with suction cups 4 to any vertical surface. Alternatively, the suction cups may be replaced by permanent mountings, such as wood or metal screws. Loops 5 are provided in ends of the wire for receiving knobs 6 of the suction cups.

A particular suitable form of suction cup is a clear plastic nonmarking suction cup made in the United States by Adams Manufacturing Company. The cup has approximately a 1¾ inch diameter and a ½ inch knob. Loops are provided at the tops of the cups which may be attached to vertical surfaces with appropriate tacks or screws to augment operation of the cups if desired. Partial holes in the center of the knobs may serve the same purpose. However, it is desirable to attach the suction cups to a vertical flat surface, such as an oven door, solely by the negative pressure provided within the suction cups.

Vertical pieces 7 extend downward from loops 5 to lower ends 9. Legs 11 extend upward and outward from the lower ends 9 to outer extremities 12. Middle portions 13 extend downward from outer extremities 12 to a midpoint 15, forming a general V shape and forming within legs 11 a general M shape.

A pot cover 14 with a knob 16 is held in the holder 1. The knob 16 rests in the notch 15 formed by the center pieces 13. Sides of the pot cover rest against the outward and upward extending legs 11.

A trough-like drip catcher 21 is connected at the bottom of legs 11 and vertical pieces 7 to catch drips from the pot covers held within the notch 15. The dripcatcher trough 21 has a rear wall 23 which extends between vertical pieces 7, a front wall 27 which extends between lower extremities of legs 11 and side walls 25 which extend between the rear and front walls. The vertical dimension of the drip catcher 21 is such that the upper edges 29 are positioned beneath an edge of a pot cover.

In a preferred embodiment, drip catcher 21 is formed of a flat blank which is first folded in a V shape, so that walls 23 and 27 fit inside vertical pieces 7 and legs 11 so that the trough-shaped piece is supported by the V-shaped bottom 9. Side walls 25 are formed by bending corners outward and rearwardly and outwardly and forwardly respectively to form tabs 31 and 32 and other tabs on the rear wall which are not shown. Tabs may be fastened to the walls 23 and 27 by any convenient means, for example by stapling.

The entire pot cover holder may be placed in a dishwasher for cleaning. Replacement drip-catcher troughs may be provided.

When removing the suction cups from a vertical surface, one simply pushes on the knobs in a direction toward the vertical surface to which the suction cups are attached. While pushing on the knobs, one lifts outward on edges of the suction cups by pulling on the tabs at the top of the suction cups.

One holder fits covers of varied sizes. More than one cover may be placed within a holder.

While the invention has been described with reference to specific embodiments, modifications and variations of the invention may be made without departing from the scope of the invention which is defined in the following claims.

We claim:

1. Pot cover holder apparatus comprising a single continuous wire having a loop in a first end and having a first suction cup attached to the first loop, the wire extending downward in a first vertical part and having a first bend so that the wire extends upward and outward forming a first outward leg and having a second bend so that the wire extends downward and transversely forming a medial point and having a third bend so that the wire extends upward and transversely and having a fourth bend so that the wire extends downward forming a second leg and having a fifth bend so that the wire extends upward forming a second vertical part terminating upwardly in a second loop which is attached to a second suction cup, and a drip-catching trough connected to the pot cover holder apparatus for receiving drips from the pot cover holder, wherein the drip-catching trough comprises a front wall extending between the legs and a rear wall extending between the vertical parts and side walls extending between the legs and vertical parts on opposite sides thereof and means for connecting the trough to the continuous wire, and, wherein the suction cups attach the pot cover holder to a separate vertical surface.

2. The apparatus of claim 1 wherein sides of the pot cover holder apparatus are formed in general V shapes and wherein a medial portion of the pot cover holder apparatus is formed in a general V shape in a plane substantially transverse to the first V shapes of the sides and wherein the legs and medial portion form a generally M-shaped planar structure, whereby the medial portion receives a knob of a pot cover and holds the knob with the pot cover resting against the legs of the holder.

3. A pot cover holder comprising:
 a unitary wire frame having two legs and having a V-shaped notched means for holding a pot cover;
 an attachment means for mounting the holder on a separate vertical surface; and
 a drip-catching means for receiving drips from the pot cover;
 the legs of the frames having loops for receiving the attachment means, including downward extending legs, the legs extending vertically downward and parallel to one another from the loops, each leg having a first bend adjoining said downward extending legs to a respective upward extending leg that; extends upward at about a 45° angle therefrom, each of said upward extending legs having a second bend at an end opposite the first bend wherein said second bends are adjoined to the notched means of the frame, and the frame forming a general M-shaped and
 wherein the drip-catching means comprises a V-shaped trough positioned within the first bend of the legs and having a first wall overlaying the downward extending legs and a second wall overlying the upward extending legs and side walls interconnecting the first and second walls.

4. The apparatus of claim 3 wherein the attachment means comprises suction cups having outward extending knobs and wherein the loops of the wire are placed around the outward extending knobs.

* * * * *